US007155806B2

(12) United States Patent
Rossi

(10) Patent No.: US 7,155,806 B2
(45) Date of Patent: Jan. 2, 2007

(54) METHOD OF PRODUCING SUPERCONDUCTORS

(75) Inventor: Sergio Rossi, Fornaci Di Barga (IT)

(73) Assignee: EMS-Europe Metalli Superconductors S.p.A., Florence (IT)

( * ) Notice: Subject to any disclaimer, the term of this patent is extended or adjusted under 35 U.S.C. 154(b) by 186 days.

(21) Appl. No.: 10/686,787

(22) Filed: Oct. 17, 2003

(65) Prior Publication Data

US 2004/0206544 A1    Oct. 21, 2004

(30) Foreign Application Priority Data

Oct. 23, 2002    (IT)    ............................ TO2002A0927

(51) Int. Cl.
*H01L 39/24* (2006.01)
(52) U.S. Cl. ......................... 29/599; 29/33 F; 29/825; 29/828; 29/868; 174/125.1; 505/230; 505/234; 505/431; 505/950
(58) Field of Classification Search ................ 29/33 F, 29/599, 868, 872, DIG. 11, 825, 828; 174/15.4, 174/125.1, 128.1, 128.2, 130, 15.5, 24; 505/230–234, 505/431, 950
See application file for complete search history.

(56) References Cited

U.S. PATENT DOCUMENTS

| 3,686,750 | A |   | 8/1972  | Woolcock et al. ............ 29/599 |
| 3,699,647 | A |   | 10/1972 | Bidault et al. ................ 29/599 |
| 4,109,374 | A | * | 8/1978  | Whetstone et al. ........... 29/599 |
| 4,264,358 | A | * | 4/1981  | Johnson et al. ............. 148/403 |
| 4,575,927 | A | * | 3/1986  | Braginski et al. ............. 29/599 |
| 4,860,431 | A | * | 8/1989  | Marancik et al. ............. 29/599 |
| 5,501,746 | A | * | 3/1996  | Egawa et al. ................. 29/599 |
| 6,112,395 | A | * | 9/2000  | Quick et al. ........... 29/DIG. 11 |

* cited by examiner

*Primary Examiner*—Minh Trinh
*Assistant Examiner*—Donghai D. Nguyen
(74) *Attorney, Agent, or Firm*—Berenato, White & Stavish

(57) ABSTRACT

Method of producing superconducting cables by using cold plastic deformation operations only including the step of obtaining a bar-like semi-finished product of prefixed dimension through the steps of: forming round-section, mono- or multifilament, superconducting copper bars of relatively long length; assembling the bars about a cylindrical copper core of substantially the same length, using assembly templates, the templates having through holes arranged in a circle to support the bars, and a central through seat for supporting the core; tying the bars onto an outer lateral surface of the core; sliding onto one end of the bar/core assembly a number of metal supporting rings, while sliding the templates off the opposite end thereof; sliding a copper tube onto the bar/core assembly while cutting the ties in axial sequence and sliding off the supporting rings; and subjecting the assembly to a number of drawing operations.

11 Claims, 2 Drawing Sheets

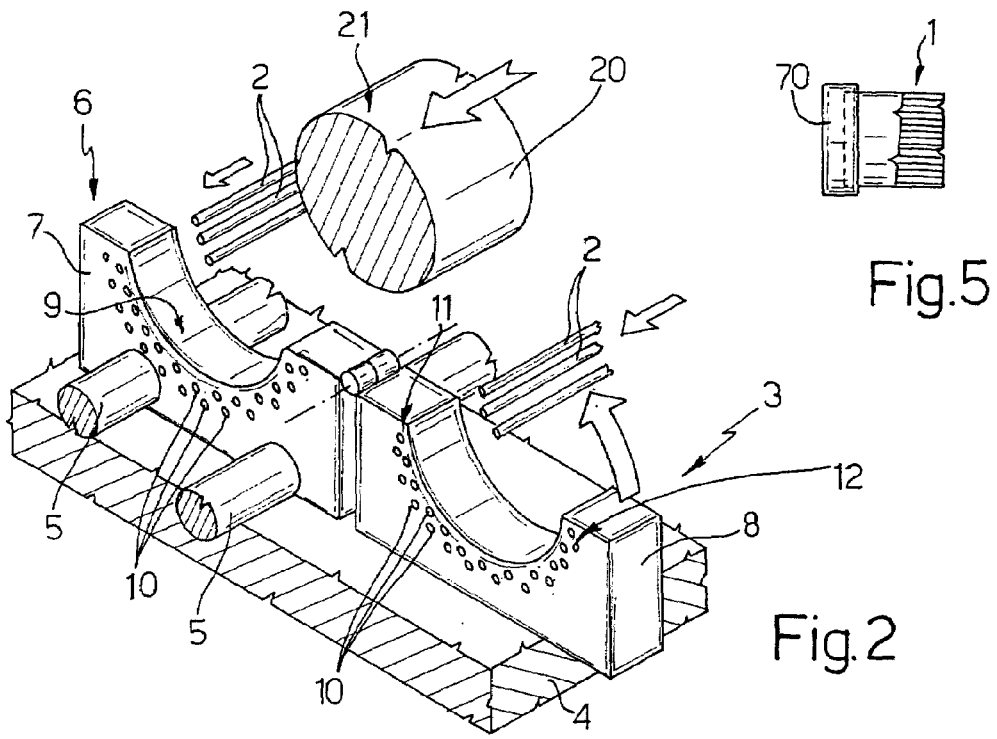
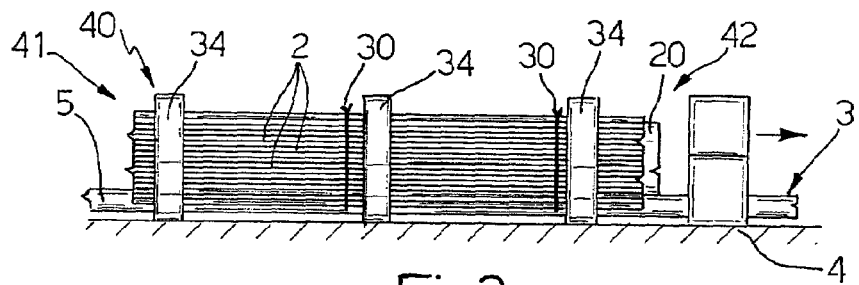
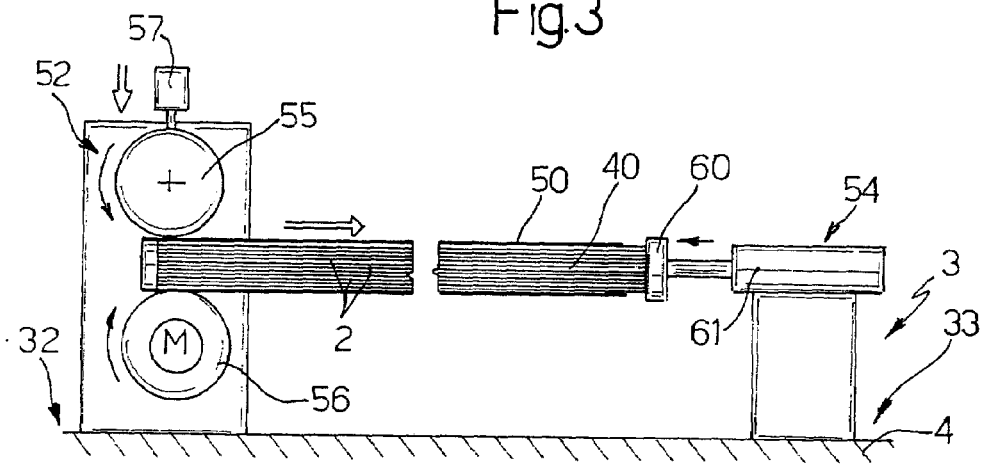

METHOD OF PRODUCING SUPERCONDUCTORS

The present invention relates to a cold composition method for obtaining a bar-like semifinished product from which to produce superconducting cables, particularly of niobium-titanium (hereinafter indicated "NbTi").

The invention also relates to a superconducting cable produced from such a bar-like semifinished product.

BACKGROUND OF THE INVENTION

At present, superconducting, in particular NbTi, cables are produced from an assembly comprising a cup-shaped copper ingot, into which are inserted, in orderly manner, the ends of bars having a core of superconducting material, defined by one or a number of wires of NbTi, and a sheath of copper (and/or other noble metal). The bars are short (at most about 800 mm long), and are hexagonal in cross section to "fit" easily inside the copper ingot. The free end of the ingot is then sealed by welding on a copper cap, a vacuum is formed inside the assembly so formed, and it is subjected to one or more hot extrusion steps (at temperatures of around 500° C.) to reduce it to the size of a 60–80 mm diameter bar (of over 10 m in length). At this point, possibly after being heat treated, the bar-like semifinished product is cold drawn gradually to form a superconducting cable.

A major drawback of superconducting, particularly NbTi, cables produced as described above lies in their having a fairly low critical current (Jc) with respect to the capacity of the alloy.

The Applicant's technicians, however, have found that eliminating any hot extrusion from the processing cycle of NbTi superconductors increases critical current (Jc) by over 25% for a given chemical composition of the superconductor and for given alpha values (Cu to NbTi volume ratio of the cable).

SUMMARY OF THE INVENTION

It is therefore an object of the present invention to provide a method of producing superconducting, in particular NbTi, cables, which provides for increasing the critical current of the superconducting cable.

It is a further object of the present invention to provide a cold composition method for obtaining a bar-like semifinished product from which to produce superconducting cables, and which is cheap to implement, and provides for simpler, faster processing, while at the same time ensuring a high quality standard.

According to the present invention, there is provided a method of producing superconducting, in particular NbTi, cables from mono- or multifilament superconducting bars, characterized by comprising exclusively cold plastic deformation steps.

More specifically, the invention also relates to a "cold" composition method, i.e. employing exclusively cold plastic deformation operations, for obtaining a bar-like semifinished product, and comprising the steps of: forming round-section, mono- or multifilament, superconducting copper bars of relatively long length; assembling said bars about a cylindrical copper core of substantially the same length, using assembly templates which open book-fashion and are fitted to and slide along an assembly bench, the templates having through holes arranged in a circle to support the bars, and a central through seat for supporting the core; tying the bars onto an outer lateral surface of the core; sliding onto one end of the assembly so formed a number of metal supporting rings resting on the assembly bench, while sliding said templates off the opposite end of the assembly; sliding a copper tube onto the assembly so formed, while at the same time cutting the ties in axial sequence and sliding off said supporting rings; and performing a number of drawing operations on the finished assembly to gradually reduce the cross section and increase the length of the assembly to obtain a bar-like semifinished product of the required dimensions, from which, after salt bath heat treatment, a superconducting cable is obtained by cold drawing.

By eliminating any hot extrusion, the superconducting cable obtained by cold drawing the bar-like semifinished product described has 25% higher critical currents than the same type of superconductor, in which the starting bar is composed in conventional manner, i.e. assembled in the form of an ingot and then compacted and hot extruded.

Moreover, the composition method described starts from round-section superconducting bars, which are easier to make, and which are already of considerable length (about 5 m), so that the bar-like semifinished product (about 14 m long) is obtained faster and more cheaply.

Finally, the bar-like semifinished product produced according to the invention by exclusively cold processing (i.e. at substantially ambient temperature) can be substituted for currently used semifinished extruded bars on conventional drawing systems, with no alterations required to the finished superconductor cable production systems.

BRIEF DESCRIPTION OF THE DRAWINGS

A non-limiting embodiment of the invention will be described by way of example with reference to the accompanying drawings, in which:

FIG. 2 shows a schematic view in perspective of one step in the cold composition method according to the present invention, and of part of the special equipment employed;

FIG. 3 shows a schematic view of a further step in the FIG. 2 method, and a side view of a resulting assembly;

FIG. 4 shows a schematic view of a further step in the FIG. 2 method, and of the rest of the special equipment employed;

FIG. 5 shows a detail of a final step in the composition method according to the invention.

DETAILED DESCRIPTION OF THE INVENTION

Figure 1:
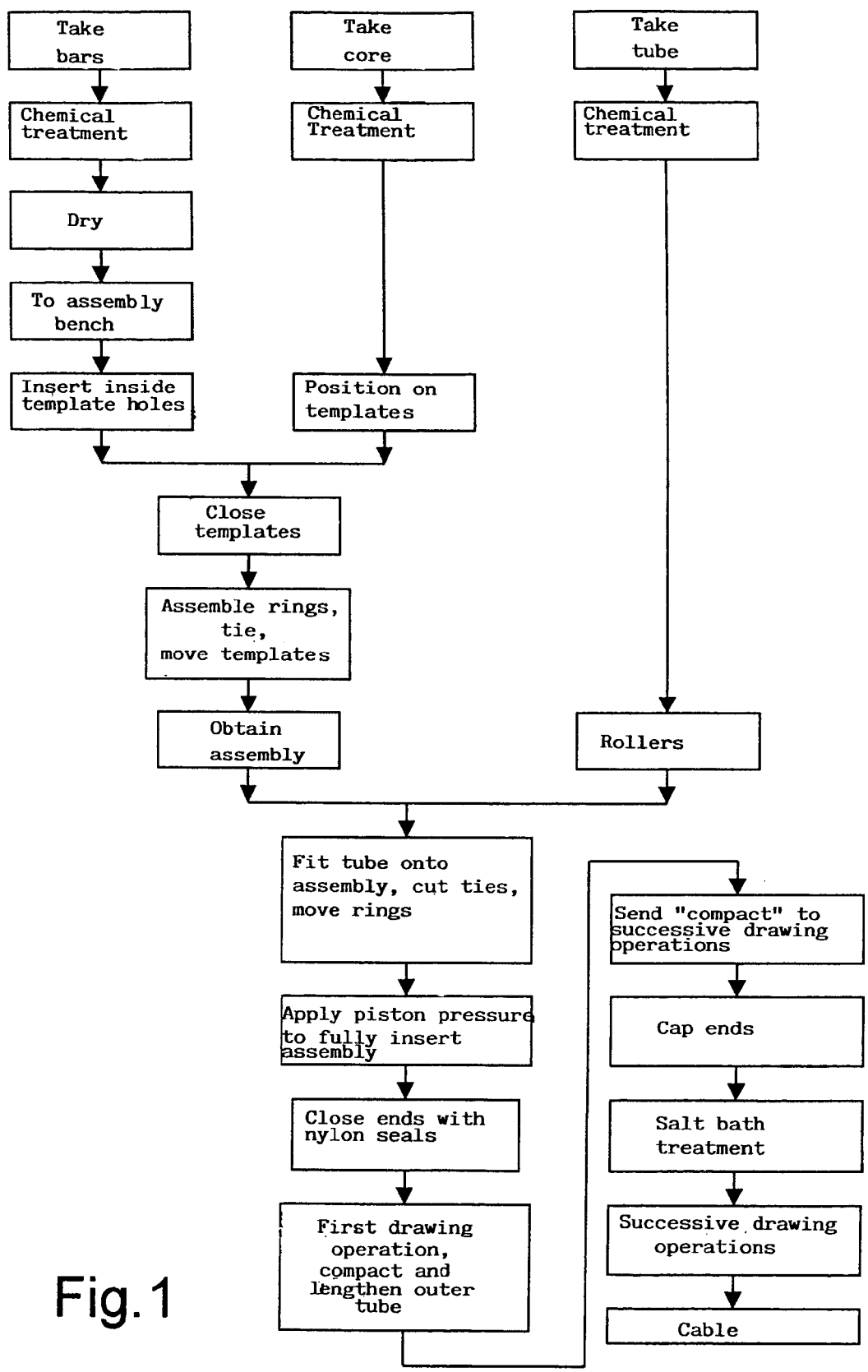
FIG. 1 shows a flow chart of the complete processing cycle for producing superconducting cables using the method according to the present invention.

With reference to the accompanying drawings, number 1 (FIG. 5) indicates as a whole a bar-like semifinished product produced by cold composition, according to one aspect of the invention, and which can be used in a method of producing superconducting cables, characterized, according to a further aspect of the invention, in that any plastic deformation step in the method is performed exclusively cold, i.e. at ambient temperature, as shown in the FIG. 1 flow chart.

The invention starts with bars 2 formed in known manner and each comprising a core defined by a mono- or multifilament of superconducting material, in particular NbTi alloy, and a copper sheath, possibly with a barrier layer of noble metal or metal alloy interposed between the superconductor and copper. In the case of multifilament bars, the core comprises 121 monofilaments of superconducting alloy.

Though, here and hereinafter, specific reference is made to NbTi superconductors and copper, the object of the invention is clearly not limited to these materials, but also extends to the use of other materials, in which the superconducting material has critical current values also depending to some extent on the degree of work hardening of the material, and in which copper is replaced by another metal or metal alloy of substantially equivalent performance in terms of operation of the superconducting cable obtained according to the invention.

Monofilament bars 2 preferably have an alpha (copper to superconductor volume) ratio of about 0.5, and multifilament bars 2 a higher alpha ratio which may be around 2.

In accordance with known technology, bars 2 must be assembled inside a copper shell, and the resulting assembly is subjected to a number of successive plastic deformation steps until the required size cable is obtained.

According to a first characteristic of the invention, as opposed to a hexagonal cross section, bars 2 have a round cross section, e.g. of roughly 4 mm diameter for final monofilaments of about 50 micron diameter, or final multifilaments of 4 micron diameter or over.

According to the invention, bars 2 are assembled inside a copper shell using a bar-like semifinished product composition method, the main steps of which are shown in detail in FIGS. 2, 3 and 4, the rest of which is shown schematically in FIG. 1, and which forms part of said semiconductor cable production method according to the invention, characterized by comprising exclusively cold plastic deformation steps.

The composition method according to the invention employs bars 2 having the characteristics described above, and further characterized by being relatively long (axially), e.g. about 5 m, i.e. at least 7–8 times the length of conventional hexagonal-section superconducting bars used in known methods.

Once formed, bars 2 are subjected to conventional chemical treatment comprising successive immersion in various degreasing and pickling baths, and drying. Dealing with such long bars, however, the bars are treated in bundles, which are inserted into a powered open-sided rotary basket designed to support the full length of bars 2, are treated chemically by immersing the rotary basket in the baths, and are dried by inserting the whole rotary basket inside a drying furnace.

The rotary basket—not shown for the sake of simplicity—is defined, for example, by a metal supporting structure, which hooks onto a lifting device and supports the motor high up so that it remains dry even when the supporting structure is immersed in the treatment baths; and by a number of rotary disks fitted idly to the metal supporting structure, connected angularly to one another, and each supporting a number of circumferentially oriented rollers (e.g. three, 120° apart) for supporting the bars. By means of the motor, a mechanical transmission rotates the disks and the rollers, which constitute the actual rotary basket, with respect to the metal supporting structure.

The treated bars 2 are then sent to an assembly bench 3 shown schematically in FIGS. 2 and 4. Similarly, a solid cylindrical copper core 20 of substantially the same length as bars 2 is also treated in the rotary basket described above, and then also sent to assembly bench 3.

Bench 3 comprises a bed or actual bench 4 with straight, e.g. cylindrical, guides 5, along which slide a number of assembly templates 6 (only one shown in FIG. 2) which open book-fashion. Each template 6 comprises a bottom half-member 7 which engages and slides along guides 5; and a top half-member 8 located alongside and turned over 180° with respect to half-member 7, the top half-member 8 being hinged either directly to corresponding half-member 7, as shown schematically in FIG. 2, or, preferably, to a further guide (not shown) parallel to guides 5 and along which half-member 8 also slides.

Half-members 7 and 8 are saddle-shaped so as to define, when half-member 8 is turned 180° over onto half-member 7, a cylindrical through seat 9 through which core 20 is housed and supported, and so supported by templates 6 on bench 3 with its axis of symmetry parallel to guides 5. Similarly, half-members 7, 8 have a number of through holes 10 arranged concentrically in a circle about central cylindrical seat 9 (when half-members 7, 8 are assembled one on top of the other to form template 6) and of such a diameter as to house bars 2, one through each hole 10, so that bars 2 are also supported by templates 6 in a circle about core 20 on bench 3 and parallel to guides 5.

Holes 10 may be arranged in one circle about seat 9, or, as in the example shown, in two concentric circles, the radially inner one indicated 11, and the radially outer one indicated 12.

To begin with, a number of bars 2 are inserted inside holes 10 in the outer circle 12, with templates 6 still open, and with half-members 7, 8 side by side and turned over with respect to one another; the remaining bars 2 are then inserted inside holes 10 in the inner circle 11; and, finally, core 20 is placed on half-members 7, and half-members 8 (with the bars inserted inside them) are turned over in the direction of the arrow (FIG. 2) to close, and so grip core 20 inside, templates 6.

Bars 2 are thus supported in orderly manner about core 20, at which point, the bars are bound onto an outer lateral surface 21 of the core by means of ties 30 (FIG. 3), e.g. tied manually and made of copper wire. Ties 30 are tied successively, one at a time, working gradually along guides 5, from one end 32 (FIG. 4) to the opposite end 33 of bench 3.

At the same time, still starting from end 32, a number of rings 34, e.g. of copper, are fitted to bench 3, so as to rest on and slide along guides 5, and so as to enclose core 20 and bars 2, with bars 2 contacting surface 21. The above operations are obviously performed some distance from each template 6 to allow bars 2 to flex and contact surface 21. More specifically, starting with a first tie, as the first ring 34 is assembled at end 32, templates 6, still in the closed position, are slid back gradually towards end 33 along guides 5. A second ring 34 is then assembled, which therefore takes over from the slid-back templates 6 in supporting core 20 and bars 2 tied to core 20 by ties 30, while the first ring 34 is slid further along guides 5, and further ties 30 made.

At the end of the above steps, an assembly 40 is obtained, supported on bench 3 by rings 34 and defined by bars 2 assembled in a circle against core 20 and retained by ties 30, while templates 6 are by now all released and moved to end 33, where they are gradually slid off guides 5 as they are released from bars 2 and core 20.

In other words, a step is performed in which rings 34 are slid onto a first end 41 of assembly 40 adjacent to end 32 of bench 3, while templates 6 are slid off a second end 42 of assembly 40 (shown partly in cutaway section in FIG. 3) opposite the first end and therefore adjacent to end 33 of bench 3.

At this point, a copper tube 50 (FIG. 4) is slid onto assembly 40, starting from first end 41 of assembly 40; and, at the same time, ties 30 are gradually cut as they are reached by tube 50, and supporting rings 34 are gradually slid off second end 42 of assembly 40, to eventually obtain an assembly 40/copper tube 50 assembly, in which bars 2 are held in position against copper core 20 solely by copper tube 50 fitted concentrically and coaxially with core 20.

The above step is performed with the aid of two devices 52 and 54 (FIG. 4) fitted to bench 3 at ends 32 and 33 respectively.

More specifically, device 52 is a so-called "pinch-roll" device fitted removably to end 32 of bench 3 (e.g. so that it can be moved aside), and which comprises two rollers 55, 56 mounted parallel with an adjustable centre distance. Rollers 55, 56 are pressed against each other by compression means 57 defined, for example, by a hydraulic or pneumatic cylinder, pinch tube 50 between them as shown in FIG. 4, and at least one of which (roller 56 in the example shown) is rotated by a motor.

Device 54 is defined by a counter-head movable axially (e.g. along guides 5) towards "pinch-roll" device 52, and comprising a counter-plate 60, and a hydraulic or pneumatic cylinder 61 acting parallel to guides 5.

During said step, copper tube 50 is slid onto assembly 40 by "pinch-roll" device 52 at first end 41 of assembly 40, by virtue of the axial thrust exerted frictionally by powered roller 56 on tube 50; and, at the same time, assembly 40 is held resting axially against counter-head 54 by counter-plate 60, and the sliding movement of counter-head 54 along guides 5 is prevented at this step by stops or brakes not shown for the sake of simplicity.

The final stage in the fitting of copper tube 50 onto assembly 40 (i.e. when tube 50 is almost entirely fitted onto assembly 40, as shown in FIG. 4) is performed by stopping rollers 55, 56 to arrest copper tube 50, and by moving counter-head 54 axially forward in the example shown, by moving counter-plate 60 forward by means of cylinder 61—so as, this time, to insert assembly 40 inside tube 50 as opposed to vice versa.

As it is being fitted onto assembly 40, tube 50 comes into contact with the ring 34 closest to end 41 and pushes it towards end 42 and into contact with the next ring 34, and so on until rings 34 are all pushed gradually towards end 42 as copper tube 50 is fitted gradually onto assembly 40. To improve this step and also hold assembly 40 together when ties 30 are removed, rings 34, according to the invention, have substantially the same radial dimensions (inside and outside diameter) as copper tube 50.

At this point, the tube 50/assembly 40 assembly is removed from bench 3 and, according to the invention, undergoes a number of cold drawing operations to gradually reduce its cross section and so increase its length to eventually obtain a bar-like semifinished product 1 of the required dimensions.

According to a further aspect of the invention, after being cold drawn, bar-like semifinished product 1 is salt bath heat treated, but is first closed in substantially fluidtight manner at opposite ends by caps 70 (only one of which is shown in FIG. 5).

Caps 70 are cup-shaped to fit on the opposite ends of bar-like semifinished product 1, and are made of material having a lower thermal expansion coefficient than copper, e.g. iron, so as to be self-sealing. When heated, to perform the heat treatment, in fact, the iron expands less than the copper, thus resulting in a perfectly fluidtight, forced interference fit of caps 70 to bar-like semifinished product 1.

More specifically, the assembly 40/copper tube 50 assembly undergoes a first drawing step to achieve a relatively small reduction in section ranging between 4% and 9%, and so lock copper core 20, copper tube 50, and bars 2 mechanically integral with one another; and then a number of successive drawing steps, each resulting in a constant reduction in section, until the required dimensions are obtained.

Each successive drawing step is performed to reduce the section of the assembly 40/copper tube 50 assembly by approximately 18% to 24%.

Before being drawn, the opposite ends of the assembly 40/copper tube 50 assembly may be airtight sealed, e.g. by disposable polyamide or polyethylene seals, to protect the parts against oxidation. Unlike conventional assemblies, however, a vacuum is no longer required, in that, during drawing, the air inside tube 50 or between core 20 and bars 2 can escape from the ends of tube 50, the seals at this stage being destroyed or removed. In any event, at the first drawing step, tube 50 has been found to undergo a greater increase in length than core 20 and bars 2, thus forming "compensating" chambers for receiving the air as it escapes from the components.

At the end of the steps described, a 10–14 m long, 60–80 mm diameter bar-like semifinished product 1 is obtained, which, following salt bath heat treatment, can be subjected to a conventional cold processing cycle of successive drawing operations to obtain a superconducting cable of the required dimensions.

The superconducting cable, however, is characterized by a relatively high critical current (Jc), normally at least 20% higher than that of superconducting cables of the same section and chemical composition, but formed from hot extruded semifinished products.

Using the composition method described, the products (bar-like semifinished products 1) have a roughly 30% higher quality index value "n" with respect to extrusions, and axially constant alpha values, i.e. with none of the roughly 20% variations at the ends typical of extruded semifinished bars, thus eliminating wastage.

The invention claimed is:

1. A method of producing superconductors comprising the steps of:
    forming bars, each comprising: i) a core defined by a mono- or multifilament of superconducting material; and a ii) a copper sheath;
    assembling said bars inside a copper shell to form an assembly having predetermined configuration;
    subjecting in sequence said assembly to a number of plastic deformation operations;
wherein all said plastic deformation operations are carried out solely by cold plastic deformation steps; and wherein said bars are formed with a round cross section and a relatively long length; the step of assembling the bars inside a copper shell to form said assembly including the following steps:
    assembling said bars about a cylindrical copper core of substantially the same length thereof, using assembly templates which are openable like a book and are fitted to and slide along an assembly bench, the templates having through holes arranged in a circle to support the bars, and a central through seat for supporting the core;
    tying the bars onto an outer lateral surface of the core to obtain a semi-finished assembly defined by the bars assembled by ties in a circle against the core;
    sliding onto a first end of the semi-finished assembly a number of metal supporting rings resting on the assembly bench and enclosing said bars, while sliding said templates off a second end of the semi-finished assembly, opposite to the first end;
    sliding a copper tube onto the semi-finished assembly starting from said first end, while at the same time cutting the ties progressively as they are reached by the tube, and sliding off said supporting rings at said second end, so as to obtain said assembly, wherein said bars are retained in said predetermined configuration on the copper core by the copper tube mounted concentrically with the core.

2. The method of claim 1, wherein the assembly is firstly subjected to a first number of cold drawing operations to gradually reduce its cross section and so increasing its length, up to obtain predetermined dimension.

3. The method of claim 2, wherein at the end of said first number of cold drawing operations, said assembly brought to said predetermined dimension is heat treaded by immersing it in a salt bath.

4. The method of claim 3, wherein prior to carry out said salt bath heat treatment step opposite ends of said assembly brought to said predetermined dimension are closed substantially in fluid tight manner by caps.

5. The method of claim 4, wherein said caps are cup-shaped to fit onto said opposite ends of the assembly; and wherein said caps are made of a material selected to have a thermal expansion coefficient lower than that of copper, so as to result to be self-sealing; said selected material for the caps being preferably iron.

6. The method of claim 1, wherein said rings have substantially the same radial dimensions as the copper tube, and are pushed towards said second end by the copper tube as it is fitted gradually onto said semi-finished assembly.

7. The method of claim 1, wherein said assembly is first subjected to a first cold drawing step to achieve a relatively small reduction in section ranging between 4% and 9%, so locking mechanically said copper core, said copper tube, and said bars integral with one another; and then to a number of successive cold drawing steps, each producing a constant reduction in section, up to obtain said predetermined dimension.

8. The method of claim 7, wherein each of said successive cold drawing steps is performed to obtain a roughly 18 to 24% reduction in section of the assembly.

9. The method of claim 1, wherein said copper tube is slid onto said assembly by a "pinch-roll" device fitted removably to one end of said assembly bench, at said first end of the semi-finished assembly; said "pinch-roll" device comprising two rollers pressed against each other by compression means, and between which the tube is pinched; and at least one of the rollers being rotated by a motor.

10. The method as claimed in claim 9, wherein, at said second end of the semi-finished assembly, said assembly bench is fitted with a counter-head movable axially towards said "pinch-roll" device; as said copper tube is fitted on, the semi-finished assembly being held resting axially against said counter-head; and the final stage in the step of fitting the copper tube onto the assembly being performed by stopping rotation of said rollers to arrest the copper tube, and by feeding said counter-head axially forward to insert the assembly inside the tube.

11. The method of claim 1, wherein, prior to said step of assembling said bars about said copper core, the bars and the core are subjected to a chemical treatment.

* * * * *

UNITED STATES PATENT AND TRADEMARK OFFICE
CERTIFICATE OF CORRECTION

PATENT NO. : 7,155,806 B2 Page 1 of 1
APPLICATION NO. : 10/686787
DATED : October 17, 2003
INVENTOR(S) : Rossi It is certified that error appears in the above-identified patent and that said Letters Patent is hereby corrected as shown below:

Title Page, Item (73) Assignee: should read as follows:
(73) Assignee:   EMS-Europa Metalli Superconductors S.p.A.

Signed and Sealed this

Twenty-fourth Day of April, 2007

JON W. DUDAS
*Director of the United States Patent and Trademark Office*

UNITED STATES PATENT AND TRADEMARK OFFICE
CERTIFICATE OF CORRECTION

PATENT NO. : 7,155,806 B2  Page 1 of 1
APPLICATION NO. : 10/686787
DATED : January 2, 2007
INVENTOR(S) : Rossi It is certified that error appears in the above-identified patent and that said Letters Patent is hereby corrected as shown below:

Title Page, Item (73) Assignee: should read as follows:
(73) Assignee:    EMS-Europa Metalli Superconductors S.p.A.

This certificate supersedes Certificate of Correction issued April 24, 2007.

Signed and Sealed this

Twenty-second Day of May, 2007

JON W. DUDAS
*Director of the United States Patent and Trademark Office*